Sept. 27, 1949.  R. E. HARTSOCK ET AL  2,482,751
TRACTOR IMPLEMENT AND CONTROL
Filed July 8, 1943   6 Sheets-Sheet 1

INVENTORS
Robert E. Hartsock
BY Richard W. Hense
Emerson B. Donnell
ATTORNEY Patented Sept. 27, 1949

2,482,751

UNITED STATES PATENT OFFICE 2,482,751

TRACTOR IMPLEMENT AND CONTROL

Robert E. Hartsock, Rockford, and Richard W. Henss, Rock Island, Ill., assignors to J. I. Case Company, Racine, Wis., a corporation of Wisconsin Application July 8, 1943, Serial No. 493,852

3 Claims. (Cl. 97—50)

The present invention relates to tractors and particularly to the type of machine which embodies a tractor equipped with soil working tools, and an object is to generally improve the construction and operation of devices of this class.

Such agricultural machines are commonly equipped with mechanism for raising and lowering the tools at the end of the row and for these purposes it has been customary to employ mechanism at the rear of the tractor including rock shafts, reach rods and the like above and at the sides of the tractor platform. These mechanisms not only encumbered the platform and interfered to some extent with the operation and control of the tractor, but also constituted a hazard to the tractor operator since they would be moved with considerable force whenever the power lift mechanism was operated.

The principal object of the invention accordingly is to dispose, in a tractor equipped with soil working tools, the power lift mechanism, actuating rods and other parts to the largest possible extent beneath or at least away from the platform so as to obtain a clear platform and avoid the hazards stated.

It is desirable under some circumstances to furnish the tractor with soil working tools at the front and also at the rear, whereas under other circumstances, it is desirable to provide tools at the front only or at the rear only.

It is also an object of the invention to provide power lift mechanism which is adaptable to lifting rigs at either the front or the rear, or both, and without substantial change beyond the omission of unnecessary parts.

Tractors are often supplied equipped with power lifts but also at times are supplied without power lifts and an object of the invention is to supply certain parts and expedients which will be common to tractors having power lifts while being equally adaptable to tractors not equipped with power lifts but in which these parts are used for the purpose of lifting the soil working tools, but actuated by hand.

The manner in which these objects are accomplished will be apparent from the following specification and accompanying drawings in which satisfactory embodiments of the invention are shown, but it is to be understood that the invention is not limited to the details disclosed but includes all such variations and modifications as fall within the spirit of the invention as herein expressed.

Figure 1:
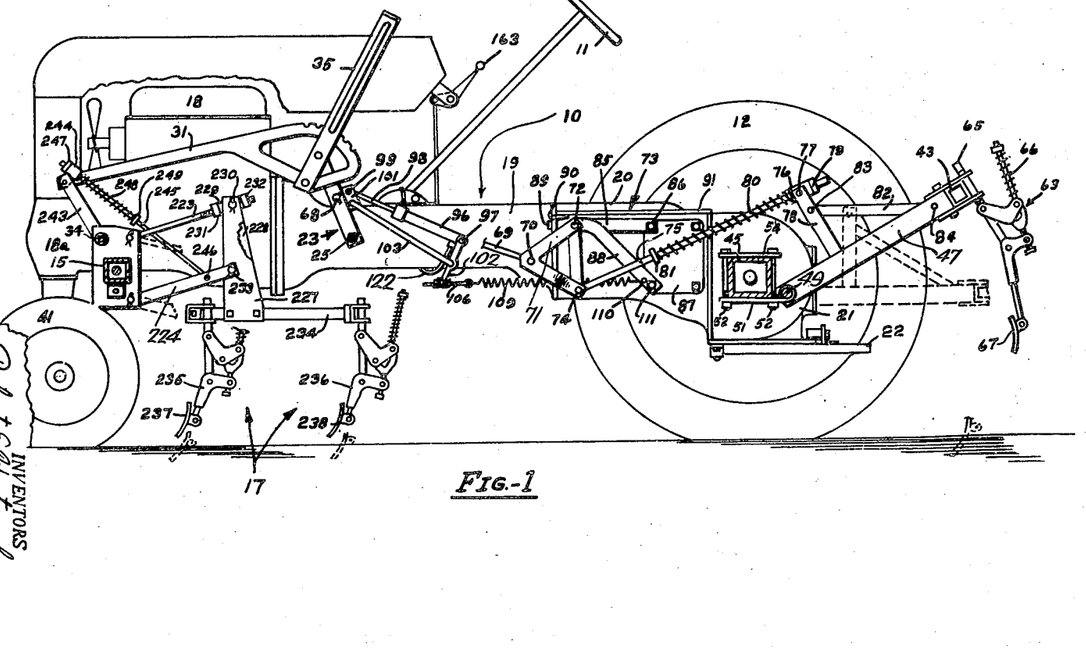
Figure 1 is a left side elevation of so much of a tractor as necessary to illustrate the invention, parts being removed and others being shown in section to avoid hiding essential elements, the tractor in this instance being equipped with cultivating implements.
Figure 2:
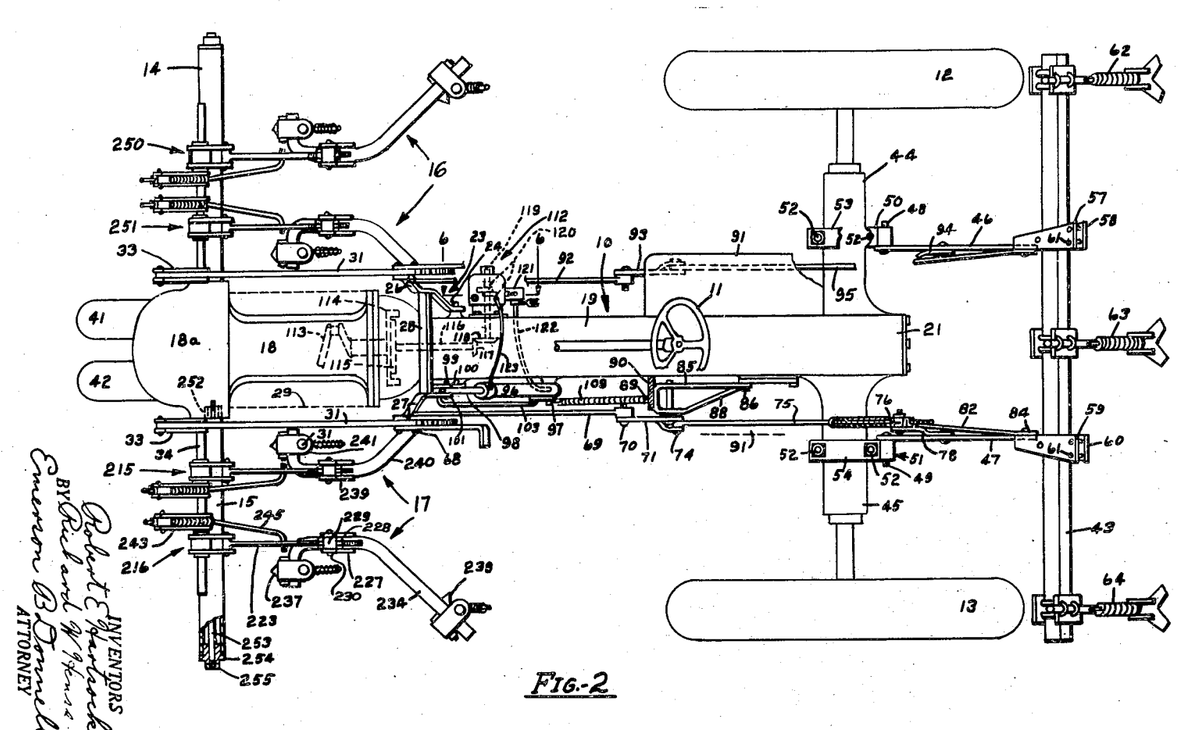
Fig. 2 is a plan view of the same with parts broken away.

In Figs. 1 and 2, a tractor cultivator is illustrated adaptable for cultivating two rows in which numeral 10 indicates a tractor, 11 the steering wheel, and 12 and 13 its driving wheels. The parts of the tractor being substantially conventional, it need not be further described in detail except as necessary from time to time as the description of the other parts proceeds.

At the forward end of the tractor is secured a supporting member in the form of square pipes 14 and 15 for supporting cultivator gangs 16 and 17 and which may be of any appropriate construction except as presently described.

The tractor comprises in general an engine portion 18, carried by a front truck 18ª a middle portion 19, a transmission section 20 and a rear axle portion 21, united as is common to form the body of the tractor and to which are connected the various implements which the tractor is to propel, and including a draw bar 22 of any suitable or well-known construction which is used when it is desired to draw vehicles or implements, which are supported independently of the tractor in well-known manner.

The present invention deals with implements which will be carried by the tractor and which may be raised and lowered, and incidental to this function a yoke member generally designated as 23 is pivotally mounted preferably astride of mid portion 19, on pintles 24 and 25 so as to be rockable fore-and-aft for controlling the position of the implements. Yoke 23 comprises generally upwardly diverging side portions 26 and 27, united by a cross brace 28, sides 26 and 27 diverging sufficiently to clear the sides of the engine hood indicated at 29 and to line up with other mechanism to be described. It is to be noted that yoke 23 is common to all the several implement arrangements illustrated.

Figures 3, 7:
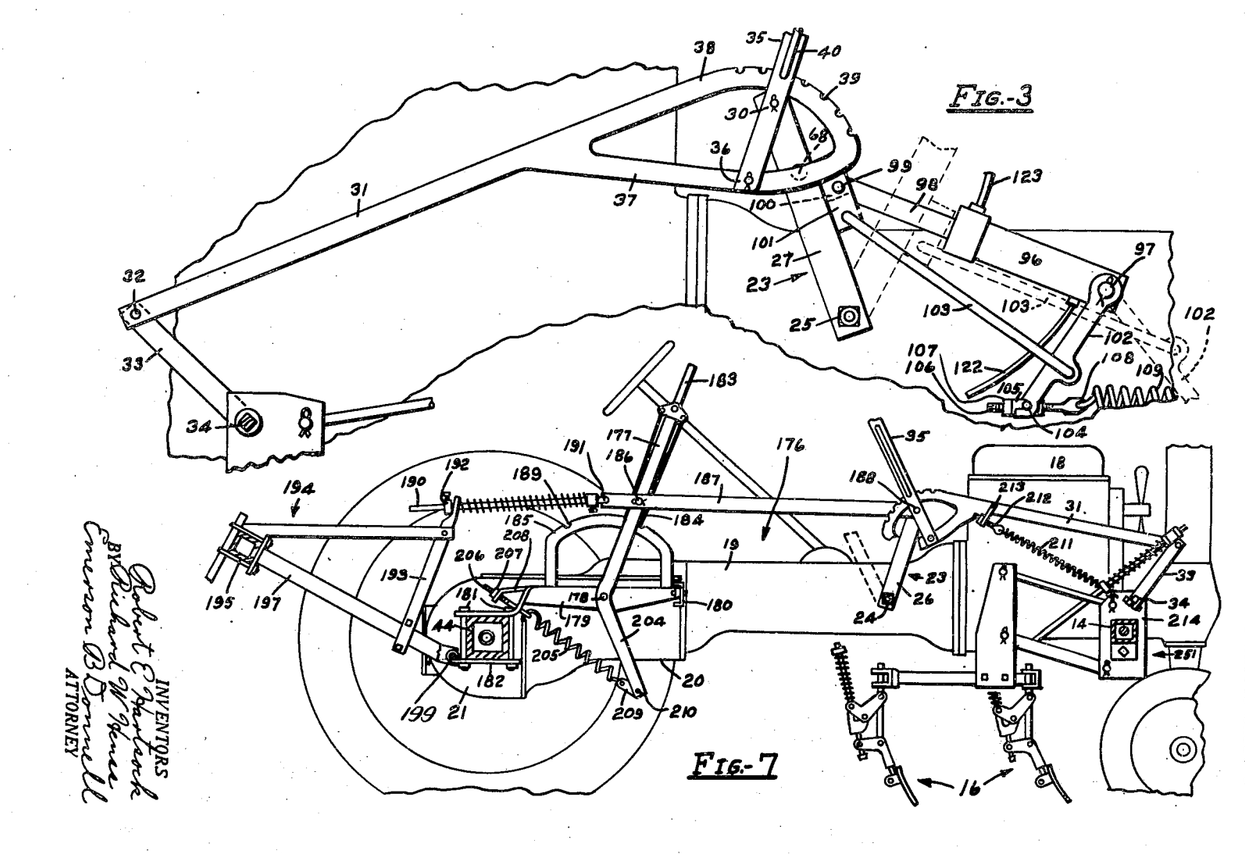
Fig. 3 is an enlarged detail of certain mechanism indicated in Figs. 1 and 2.
Fig. 7 is a right side elevation of a tractor similar to Fig. 1, showing similar mechanism but constituted to be lifted by hand.

As seen in Fig. 3, portion 27 carries a pivot, pintle or the like 30 to which is connected an actuating rod 31, connected by a pivot 32 with an arm 33 extending upwardly from an oscillating square shaft or rock shaft 34, carried on above mentioned square pipe 15 and which is operable to raise and lower implements 17 as will be apparent. The effective length of rod 31 can be adjusted by shifting the position of a lever 35 fulcrumed on above mentioned pintle 30 and which is connected by a pivot bolt or the like 36 with a portion 37 of rod 31 forming with a portion 38 a loop-like terminus of said rod.

Portion 38 is provided with a series of notches 39—39 and forms a quadrant for engaging a detent 40 for fixing the position of the lever relative to rod 31. As will be apparent, rocking of yoke 23 will cause fore-and-aft movement of rod 31, as if pivoted on pintle 30 while shifting of lever 35 will cause such movement independent of rocking of yoke 23. Thus, changing of lever 35 will alter the range of movement of rod 31, and accordingly oscillate shaft 34, assuming a constant range of movement of yoke 23. This will change the depth of penetration, for example, of implements 17.

Tractors having implements at the front are commonly provided with implements also at the back, for example for removing any tracks left by the wheels 12, 13, 41 and 42. In the present instance, a cross beam or bar 43, Fig. 2, is spaced backwardly from rear axle portions 44—45 by braces 46 and 47 pivoted respectively on pivots 48 and 49, which are preferably removably carried by axle sections 44 and 45 in clamping elements 50 and 51 secured to axle elements 44 and 45 by bolts 52—52. Bolts 52—52 clamp portions 50 and 51 beneath axle portions 44 and 45 and are connected above said portions by straps or clamping elements 53 and 54.

Braces 46 and 47 extend backwardly to clamping plates 57—58 and 59—60, respectively, between which above mentioned bar 43 is clamped as by bolts 61—61. Cultivating shovels or other desired tools 62, 63 and 64 of any desired or suitable type are fixed in well-known manner to bar 43. In the present instance, each tool, for example 63, has a shank portion 65, a safety release of well-known type generally designated as 66 and a shovel portion 67. Tools 62 and 64, being identical with 63, will not be further described.

As above indicated, the construction including bar 43 and braces 46 and 47 may be raised and lowered by rocking of yoke 23, and this is accomplished as follows: Yoke 23 has a pivot 68 connected by a link 69 to a pivot 70 on a bell crank 71, pivoted on a fulcrum 72 fixed on a bracket or master frame portion 73. Pivoted at 74 to above mentioned bell crank 71, is a link 75 slidable in a trunnion block 76 pivoted at 77 in the present instance in a bifurcated upwardly extending arm 78 fixed with brace 47. Link 75 has a collar 79 preventing sliding of the link in one direction and a spring 80, compressed between block 76 and a collar 81, yieldingly maintains block 76 against collar 79. It will now be apparent that fore-and-aft rocking of yoke 23 will cause up-and-down movement respectively of bar 43. Arm 78 is braced by a member 82 attached at 83 to the arm and at 84 to brace 47.

Bracket or master frame portion 73 comprises an upper leg 85 fastened to transmission portion 20 by a screw or the like 86, conveniently one holding a brake housing 87. Leg 85 extends forward close to transmission 20 and doubles back, in the present instance to form a lower leg 88, a bolt 89 fastening the juncture of the two legs to a bracket 90 permanently attached to the tractor for supporting a platform or foot plate 91.

The above described elements are preferably duplicated on the other side of the tractor, a link 92 connecting with a bell crank 93, which connects in turn with an arm 94 through a link 95. In this way the lifting force is divided between braces 46 and 47 so that the lift will be even, without making the structure unnecessarily stiff and heavy.

Yoke 23 is preferably rocked by power derived from the tractor engine, and for this purpose a hydraulic cylinder 96 is pivotally mounted at 97 on mid-portion 19 and has a ram 98 acting forwardly on a pivot 99 carried in ears 100 and 101 on yoke 23. Motion imparted to the one will therefore be transmitted to the other as will be apparent. Fluid under pressure for actuation of the ram may be obtained for certain purposes in any well-known manner, a preferred arrangement being described presently. Suitable mechanism is provided for retracting ram 98, in the present instance a lever 102, Fig. 3, being fulcrumed on above mentioned pivot 97 and connected by a link 103 with ear 101. Lever 102 carries, by means of a pivot or trunnion 104, a block 105 through which a bolt 106 is adjustable by means of a nut 107. Bolt 106 has an eye portion 108 with which is engaged a spring 109. Spring 109 extends rearwardly and is anchored at 110 (Fig. 1) to above mentioned leg 88 of master frame 73 which leg is fastened by a screw 111 which also fastens above mentioned brake housing 87. Spring 109 therefore exerts a continual pull on link 103 and swings yoke 23 rearwardly whenever pressure is released from cylinder 96.

The pressure fluid for cylinder 96, in the present instance, comes from a reservoir and pump unit generally designated as 112 (Fig. 2). Power originating in a crank shaft 113 of engine 18 is transmitted rearwardly through a fly wheel 114, a clutch 115, a drive shaft 116 and a pair of bevel gears 117 and 118 to a shaft 119 which in the present instance may be used to drive a belt pulley if desired. Shaft 119 carries one or more cam members or the like 120—120 which actuate a pump generally designated as 121, which supplies fluid through a flexible conduit 122, a bleeder line or pipe 123 leading back from cylinder 96 to unit 112. Pump unit 121 may be caused to force pressure fluid into cylinder 96 through conduit 122 for rocking yoke 23 forwardly or to exhaust fluid from cylinder 96 for rocking yoke 23 rearwardly, ram 98 being retracted by rearward rocking of the yoke caused by spring 109 and its associated mechanism.

Figure 4:
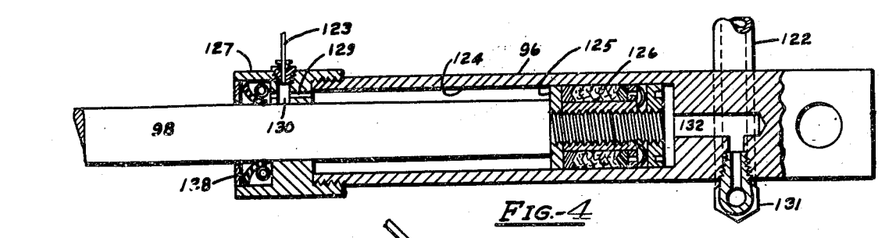
Fig. 4 is a vertical axial sectional view of a ram indicated in Figs. 1 to 3.
Figures 5, 6:
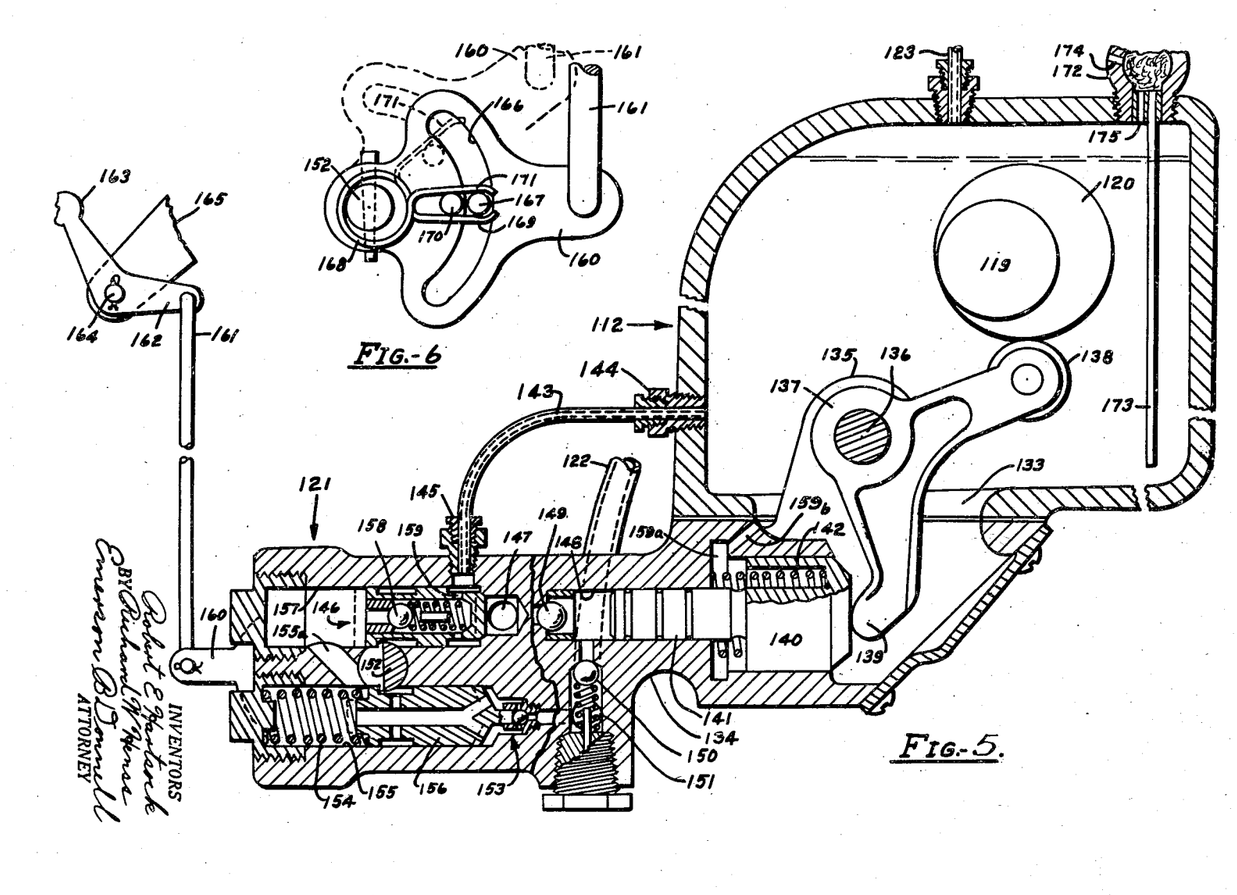
Fig. 5 is a vertical sectional view of a hydraulic pump unit taken on the line 5—5 of Fig. 2.
Fig. 6 is an enlarged left side elevation of certain mechanism indicated in Fig. 5.

Although certain variations are contemplated, a preferred arrangement of fluid system for rocking yoke 23 is indicated in Figs. 4 and 5. As seen in Fig. 4, cylinder 96 has a bore 124 in which is reciprocable a piston 125 provided with suitable packing of well-known form 126. Piston 125 is suitably fixed on above mentioned ram or piston rod 98 which reciprocates within bore 124. Ram 98 is guided in a cap or head portion 127 provided with a suitable packing generally designated as 128. Head 127 is provided with a bore 129 leading from bore 124 to a bore 130 communicating with above mentioned bleeder pipe 123. Above mentioned pressure pipe 122 connects with a fitting 131 leading into a passageway 132 within cylinder 96 and leading to bore 124. Pressure in pipe 122 accordingly acts on piston 125 and any fluid escaping past packing 126 finds its way through bores 129 and 130 to be returned by pipe 123 to reservoir 112. Pipe 123 also acts as a breather for the space between piston 125 and head or cap 127.

Reservoir 112, as seen in Fig. 5, comprises in the present instance a hollow casting providing a bottom opening 133 in which is suitably secured a pump casting generally designated as 134. Casting 134 has upstanding ears as 135 projecting into reservoir 112 and supporting a pivot shaft 136 on which is rockably mounted, in the present instance, a pair of bell cranks as 137. These bell cranks actuate a corresponding pair of pump plungers, one of which is shown in vertical axial section in Fig. 6, the plungers being identical, only one being shown. Bell crank 137 has a roller or the like 138 contacting above mentioned cam portion 120 and also a tappet portion 139 normally in engagement with a head 140. Head 140 is formed on or otherwise fixed to a plunger 141 slidable in a bore in casting 134, the whole being urged to the right as seen in Fig. 6 by a spring 142. Reciprocation of the pump plungers draws pressure fluid from reservoir 112 through a suction pipe 143 connected with reservoir 112 and casting 134 by suitable fittings as 144 and 145. The fluid passes through a control valve generally designated as 146 to a passageway 147 communicating with the two pump cylinders formed in casting 134, one of which is designated as 148. Reciprocation of the plungers pumps fluid in well-known manner, sufficient to say through a suction valve 149 into cylinder 148 and forcing the fluid outwardly through a discharge valve 150. Fluid leaving the pump cylinders enters a passageway 151 which communicates with above mentioned pressure conduit 122. This is the action when lifting implements by power and takes place when control valve 146 is in the dotted position shown. Valve 146 is moved into this position by a rocking control shaft 152 having a flat portion as indicated. During lifting movement there is no tendency for valve 146 to close and the lifting movement accordingly continues regardless of the position of shaft 152, to the point where further movement is blocked by the linkage or attached implement parts or by contact of piston 125 with head 127. The pressure in passageway 151 then rises sufficiently to unseat a combination safety and control valve 153 held in place by a spring 154. Pressure fluid is thereby liberated to a bore 155 in which a valve control element 156 is reciprocable, and pressed by above mentioned spring 154 against valve 153. Fluid in bore 155 is communicated through a bore 155a to a bore 157 containing above mentioned valve 146. The pressure of the fluid forces valve 146 to the right and into the full line position thereby closing communication between pipe 143 and passageway 147. This prevents further access of fluid to pump cylinder 148 whereupon after one more instroke, atmospheric pressure will prevent another outstroke of plunger 141 under the influence of spring 142. Reciprocation of plunger 141 thereupon stops until such time as it is again desired to lift the implements. Fluid expelled by the pistons after closure of valve 146, passes control valve 153 and escapes past a relief valve 158 provided in the present instance within valve 146. This fluid escapes through a passageway 159 back to suction pipe 143. The pressure remains built up in passageway 151 and holds the implements in raised position.

When it is desired to lower the implements, control shaft 152 is rocked in the opposite direction moving control element 156 into the dotted position shown. This releases valve 153 and therefore the pressure in passageway 151 and pipe 122. Piston 125 is therefore retracted by spring 109 as above described, the pressure fluid passing valve 153, and valve 158 and passing to reservoir 112 through passageway 159 and pipe 143.

It will be apparent that springs 142 might be made to have different strengths and that if these springs were made strong enough to overcome atmospheric pressure against plunger 141, the plunger would continue to work even though valve 146 were closed. Either mode of operation is contemplated but it is noted that in the first, namely wherein spring 142 is overcome by atmospheric pressure, the working parts are substantially at rest when not in use, with consequent minimizing of wear or other deterioration.

The space behind plunger head 140 is connected by a passageway 159a with the corresponding space behind the opposite plunger (not shown) and passageway 159a is vented to reservoir 112 by a bore 159b. Passageway 159a provides for rapid interchange of fluid between one head 140 and the other so that fluid behind the heads will not interfere with the free movement thereof.

Control shaft 152 is made fluid tight in any suitable or well-known manner where it leaves casting 134 and has an arm 160 connected by a link 161 with an arm 162 on a control lever 163 fulcrumed on a pivot 164 carried on a bracket 165 supported from any convenient part of the tractor.

Arm 160 in the present instance is enlarged and slotted at 166, Fig. 6, and a stop pin 167, fixed with casting 134 limits the swinging of the arm to the correct amount to actuate members 146 and 156, and a spring 168 is coiled in the present instance, about shaft 152 and acts to center the arm and shaft so as to leave said members free when no force is exerted on lever 163. For this purpose, one end, 169 of the spring is engaged on one side of above mentioned stop pin 167 and also on one side of a lug 170 fixed with arm 160. The other end, 171 of the spring is engaged on the other side of pin 167 and lug 170 with the result that, when lug 170 is displaced from pin 167, by swinging of arm 160, spring 168 is "opened" as indicated in dotted lines. Spring 168 is biased to resist opening and accordingly returns the parts to the central position shown as soon as any displacing force is removed.

Reservoir 112 has a filler plug 172 carrying a measuring device or "stick" 173, which indicates the level of fluid in the reservoir when plug 172 is removed, the plug being hollow and containing a quantity of cotton waste or other suitable filtering material. A vent opening or openings 174 lead into the body of the plug and an opening 175 leads from the interior of the plug to the interior of reservoir 112. In this manner the interior of the reservoir is vented to the atmosphere without admitting dirt to the system.

Tractors of the character hereinabove set forth are often sold under conditions which do not justify the added cost of the power lift, and under such conditions the implements can be lifted by hand by the exertion of the necessary additional manual force, certain of the above described parts being retained and used with the hand lift as hereinbefore stated.

Thus, as seen in Fig. 7, a tractor 176, in itself identical with above described tractor 10, is fitted with the same front rigs 16 and 17, lift rods 31, and yoke 23. Thus the manufacture of these units can be carried out in sufficient quantity to supply both hand and power lift tractor cultivators, with consequent economy. Rocking of yoke 23, Fig. 7, will raise and lower rigs 16 and 17 in the identical manner above described in connection with Figs. 1 and 2. However, in the present instance a lever 177 is fulcrumed on a pivot 178 carried by a support 179 fixed with a bracket 180 permanently attached to the tractor and corresponding to above described bracket 90. Support 179 is anchored at its rear end by bolts 181—181 and comprises part of a clamping portion corresponding to above mentioned element 53. A lower clamping element 182 is secured by bolts 181 to axle portion 44 and serves to pivotally support a rear cultivator frame as will appear.

Lever 177 may be of any suitable type within the contemplation of the invention in the present instance having a pivoted handle or grip portion 183 actuating suitable detent mechanism generally designated as 184 engaging with a quadrant 185 carried in the present instance by support 179. Lever 177 is connected through a pivot 186 and a link 187 with a pivot bolt 188 corresponding substantially with above mentioned pivot bolt 30 and serving also to connect above mentioned lever 35 with yoke 23.

Rocking of lever 177 will accordingly cause corresponding rocking of yoke 23 and raising and lowering of rigs 16 and 17.

Rocking of portion 183 disengages detent mechanism 184 in well-known manner, the latter automatically reengaging with notches as 189 in quadrant 185 at predetermined points. This action automatically locks the mechanism in either raised or lowered position without attention on the part of the operator.

Link 187 has a rearwardly extending rod 190 pivoted thereto at 191 and which has a collar 192 engaging an upstanding arm 193 constituting a part of a rearwardly extending frame generally designated as 194. Frame 194 corresponds substantially with above mentioned square pipe 43 and its attached parts and includes a pipe or bar 195, Figs. 7 and 8, carried by rearwardly extending arms 196 and 197 pivoted respectively to a clamping element 198 and to above mentioned element 182 by pivot bolts as 199. Braces 200 and 201 lead respectively from arms 196 and 197 to bar 195 to steady the structure laterally, and above mentioned upstanding arm 193 is mounted in any suitable manner on arm 197. Braces 202 and 203 extend from an upper portion of arm 193 outwardly and rearwardly substantially to the points of attachment, respectively, of arms 196 and 197 to bar 195. In this way the pull of the rod is transmitted to frame 194 at one side thereof without introducing substantial distortion into the frame. Cultivator tools 62, 63 and 64 in this instance are mounted on bar 195 in a manner identical with that shown in Figs. 1 and 2.

The weight of the various cultivator parts may be considerable and, to avoid the necessity of undue manual exertion, lever 177 has a downwardly extending arm 204 connecting with a spring 205, which exerts a continuous backward pull on the arm to assist the operator in lifting the implements. In the present embodiment, arm 204 slopes forwardly, even in the most forward position of lever 177, so that, if the latter is moved back and spring 205 is stretched, the spring approaches a dead center relative to pivot 178. Thus the effect of the spring can be kept substantially constant even though it is relaxing while the implements are being lifted.

Spring 205 is anchored at one end on a bolt 206 having a nut 207 bearing against a bracket 208 carried in the present instance by above mentioned support 179. At the other end it is connected with arm 204 by a plate 209 and pivot 210. To further assist in lifting the implements, a spring 211 is preferably connected by an adjusting bolt 212 with a bracket 213 on lifting rod 31 and anchored in a plate 214 on square pipe 14, and which will be further described. Spring 211 continuously urges rod 31 forwardly and thereby assists in lifting the implements.

Figures 8, 9, 10:
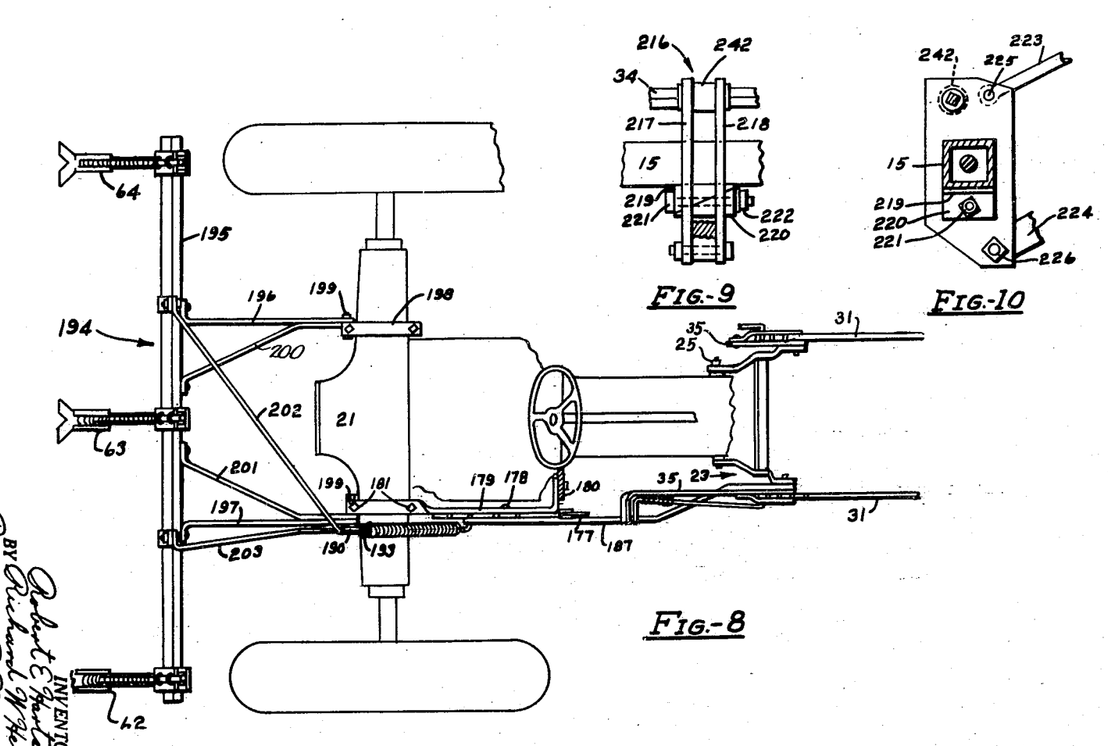
Fig. 8 is a plan view of so much of the mechanism as is characteristic of the hand lift construction of Fig. 7.
Fig. 9 is an enlarged front elevation of certain parts indicated in Figs. 1, 2, 7 and 8.
Fig. 10 is a left side elevation of the same.

Returning to a more detailed consideration of the cultivator rigs 16 and 17, referring to Figs. 1 and 2, square pipe 15 carries a plurality of clamps 215 and 216 each composed of a pair of apertured plates 217 and 218, Figs. 9 and 10, through which passes above mentioned square pipe 15. Plates 217 and 218 are clamped on the pipe in the present instance by a pair of interengaging wedges 219 and 220 inserted between pipe 15 and the lower margin of the apertures in said plates and pressed toward each other by a bolt 221 and nut 222. The wedges provide aligned openings for the bolt and which accommodate it with sufficient freedom to allow considerable movement of the wedges on each other without interference by the bolt. Thus tightening of nut 222 forces the wedges firmly upwardly against pipe 15 and downwardly against plates 217 and 218, thus forcing the plates downwardly against pipe 15, so that the assemblage grips pipe 15 firmly above and below and is clamped immovably thereon. However, with nut 222 loosened, the whole may be readily shifted along pipe 15 to any desired position, or removed therefrom at will.

Clamp 215 is preferably identical and need not be further described.

Clamp 216 supports upper and lower parallel links 223 and 224, respectively on pivot bolts 225 and 226, traversing the plates and supported therein and which are joined in a vertical direction by a pair of plates 227 and 228, Figs. 1 and 2, link 223 traversing a trunnion block 229 oscillatably supported on trunnions as 230 journaled in the plates. Block 229 is adjusted along link 223 by means of nuts 231 and 232 to adjust the attitude of plates 227 and 228. Link 224 is pivoted on a bolt 233.

Plates 227 and 228 may be used for attaching various implements to the tractor and which will be raised and lowered by the swinging of links 223 and 224. In the present instance a cultivator is shown in Fig. 1 having a beam 234 to which are attached standards 235 and 236 carrying shovels 237 and 238. Similarly clamping means 215 carries plates 239, Fig. 2, supporting a beam 240 equipped with shovels as 241 in similar manner. The details of these shovels forming no part of the present invention, they will not be further described.

Above mentioned square shaft 34 is slidable in bushings 242, Figs. 9 and 10, journaled in plates 217 and 218 and has an arm 243, Figs. 1 and 2, to which is pivoted a connecting block 244 in which is slidable a lifting rod 245. Rod 245 is pivotally connected at 246 to above mentioned link 224. Rod 245 is prevented from sliding through block 244 in one direction by a collar 247 and a spring 248, compressed between an abutment 249 and block 244 yieldingly urges link 224 down, upon rearward swinging of arm 243. Similar arms and rods, 243 and 245, respectively are associated with clamp 215 and the other front rigs carried by clamps 250 and 251. The latter and their attached rigs being substantially identical with clamps 215 and 216 and their attached parts, need not be further described.

Suitable or well-known expedients are utilized for holding the various parts together, in the present instance square pipe 15, Fig. 1, being received in a socket portion 252 of front truck 18ª and having a long bolt 253 traversing the pipe and engaged in truck 18ª. A cap 254 closes the outer end of pipe 15 and a nut 255 tensions bolt 253 and presses cap 254 and pipe 15 firmly into socket portion 252. Pipe 14 is held in place in an identical manner not necessary to describe further.

The above represents a complete description of a preferred working embodiment of the mechanism and expedients for attaching a cultivator to a tractor of the character described and these same parts, or many of them, are used in adapting various other implements to be used on the tractor. Great variation is possible in the details of implements necessary for the many different conditions encountered and the expedients shown are readily adaptable to these various conditions. By way of example and as representative of the various types there is shown diagrammatically, a plow attached to the tractor.

Figures 11, 12:
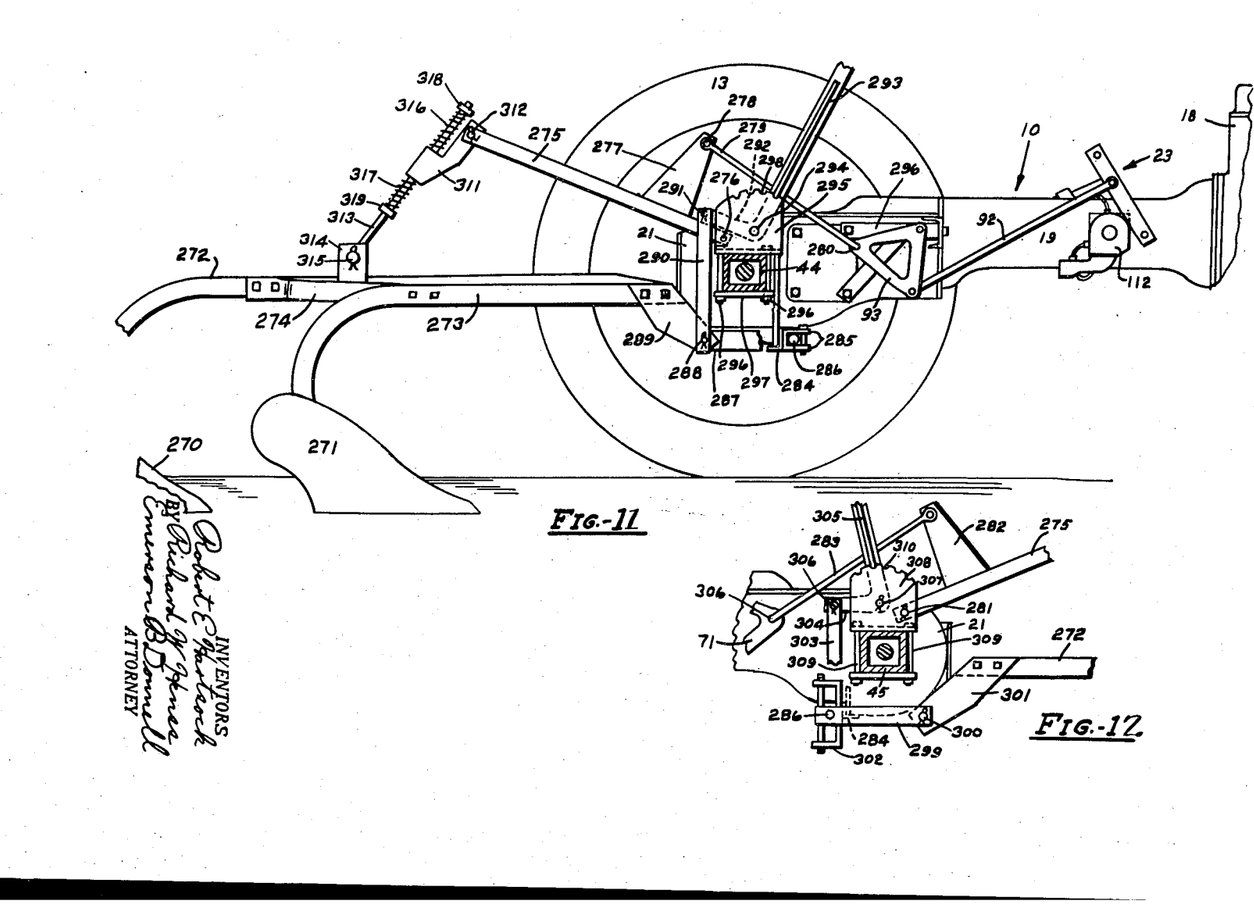
Fig. 11 is a right side elevation with parts broken away with the mechanism set up to carry and operate a plow.
Fig. 12 is a detail of the left side of the same with parts broken away.

Figs. 11 and 12 show such of the same parts as necessary to carry and actuate a plow. In this instance identical tractor 10 has the rocking yoke 23 and which is connected through above mentioned link 92 with above mentioned bell crank 93 fulcrumed on a bracket 269 corresponding to above mentioned bracket 73. The parts so far described are to be understood to be identical with and interchangeable with the corresponding parts shown in the other figures. In the present instance the tractor carries and actuates plows including share portions 270 and 271 carried respectively by beams 272 and 273 spaced apart by a spreader 274, the assemblage being drawn by the tractor and lifted when necessary by means of a yoke or lifting arm 275. Yoke 275 is pivoted at 276 on the tractor and has an upstanding arm 277 pivotally connected at 278 with link 279 connected at 280 with above mentioned bell crank 93. Yoke 275 is preferably bifurcated and also pivoted at 281, having an upstanding arm 282 connected in similar manner by a link 283 with above mentioned bell crank 71. It will therefore be apparent that swinging of yoke 23 as above fully described, will raise or lower yoke 275, thus lifting or lowering plows 270 and 271 as desired.

Returning to a more detailed description of the plows, a fitting or cross bar 284 is bolted or otherwise solidly fixed with axle portion 21 and has a bifurcated portion 285 in which is received a torsion shaft 286. Shaft 286 has a rearwardly extending arm 287 extending beneath above mentioned axle portion 44 and pivotally connected at 288 with a fitting 289 connected with above mentioned beam 273. Pivot 288 is adjustable up and down with rocking of shaft 286, by means of a link 290 connected at 291 with an arm 292 of a lever 293 fulcrumed at 294 on a plate 295. Plate 295 constitutes a clamping portion fixed on axle member 44 by bolts 296—296 engaging a clamping portion 297 engaged beneath axle portion 44. Plate 295 has a quadrant portion 298 with which lever 293 may be engaged and also supports above mentioned pivot 276. Adjusting of lever 293 raises or lowers pivot point 288 which changes the depth of operation of share 271 in a manner well understood.

Rocking of shaft 286 as better seen in Fig. 12, rocks an arm 299 fixed on shaft 286 and pivoted at 300 to a fitting 301 carried on above mentioned beam 272. Pivot point 300 is therefore raised and lowered in coincidence with pivot point 288 by the action of lever 293 so that plow share 270 is adjusted along with share 271. Lever 293 therefore adjusts the plowing depth of both shares.

As is well-known, the tractor ordinarily runs with one wheel in the furrow which gives it a substantial tilt to one side. The amount of this tilt will change with changes in the depth of plowing. Since it is desirable that the plows themselves shall run level, an adjustment is provided to accommodate this tilting of the tractor without corresponding tilting of the plow. In the present instance a yoke 302 is fixed with above mentioned bar 284 and in which is engaged above mentioned shaft 286, yoke 302 being disposed in the present instance on the left side of the tractor or the side opposite to above mentioned bifurcated portion 285. At this point shaft 286 is connected by a link 303 to an arm 304 of a lever 305 by means of a pivot 306. Lever 305 is fulcrumed at 307 in a plate 308 similar in character to plate 295. Plate 308 is clamped to axle portion 45 by bolts 309—309 and carries above mentioned pivot 281. Plate 308 also has a quadrant portion 310 for retaining lever 305 in desired adjustment. As will be apparent, shifting of lever 305 will raise or lower the left end of shaft 286 and accordingly vary the angle between tractor 10 and the assemblage constituted by beams 272, 273 and spreader 274.

Yoke 275 is connected by means of a slide fitting 311 pivoted at 312, and a rod 313 with a lug 314 by means of a pivot 315. Lug 314 is carried by above mentioned spreader 274 and constitutes the means through which yoke 275 raises beams 272 and 273. Rod 313 slides through fitting 311 and has springs 316 and 317 engaging abutments 318 and 319 on the rod for yieldably maintaining rod 313 in predetermined relation to yoke 275. Thus plows 270 and 271 are free to rise and fall to a certain extent to follow the inequalities of the ground but are controlled somewhat by springs 316 and 317 to promote steady running. It will thus be apparent that plows 270 and 271 are carried and operated by tractor 10 and may be raised and lowered by mechanism common to the tractor as above described.

The operation of the various embodiments is thought to be clear in general from the above description, it being noted, however, that lever 102, when spring 109 has completed the retracting movement of plunger 98 and the attached parts, is substantially in dead-center relation to link 103, as indicated in Fig. 3. Link 103 therefore strongly resists any forward movement of yoke 23 and thus resists upward movement of the implements attached to the linkage. The implements are thus "locked" in the ground under the pressure of springs 80, 248, etc. Plunger 98 is, of course, powerful enough to readily overcome the locking action.

What is claimed as new, and desired to be secured by Letters Patent of the United States is:

1. In a tractor having an elongated body portion and adapted for propelling a soil working implement, the combination of a yoke journaled at the mid-portion of the tractor for fore and aft rocking movement, a fluid motor for rocking said yoke in one direction, a connection from the yoke to the implement for lifting the latter upon actuation of the fluid motor, a retracting spring for the yoke anchored to the tractor and connections from the spring to the yoke including a link and lever mounted so as to be swung in one direction by said spring, said lever being so disposed as to take a substantially dead center position relatively to said link when the fluid motor is retracted and the implement is in working position, whereby to maintain said implement firmly in the ground when said fluid motor is retracted by the pressure of said spring multiplied by said link and lever.

2. In a tractor for carrying and propelling implements mounted at the front thereof, said tractor having a body portion, a support mounted at the front of the tractor, a rearwardly extending implement support carried by said front support and capable of up-and-down movement for raising and lowering an implement carried thereby, a yoke journaled at spaced points on opposite sides of said body portion, means for rocking said yoke forwardly and backwardly at will, a rock shaft for raising said implement, an adjustable connection from said yoke to said rock shaft for rocking said rock shaft through a series of ranges for providing a depth adjustment in the down position of the implement and by virtue of adjustment of said adjustable connection, an arm extending from said rock shaft and a link extending from said arm to said rearwardly extending implement support, said link being pivoted to said arm and to said rearwardly extending support at such points that said link approaches a dead center position with relation to said arm and rock shaft when said implement is in raised position, so that adjustment of said range of movement of said rock shaft has little effect on the position of said implement when it is in raised position, but a comparatively large effect on said implement when in its lowered position.

3. An implement control device for a tractor, having a slender longitudinally extending body portion, and adapted for carrying and propelling soil working implements, said device comprising a substantially rigid bifurcated yoke-like element astride said slender longitudinal body portion and journaled at transversely spaced points thereon for fore-and-aft rocking movement, a power lift ram connected for rocking said yoke-like element in one direction and connections from said yoke-like element for raising said implements in response to rocking of said yoke-like element in said direction, and means for actuating said yoke in the other direction comprising a link pivotally connected with said yoke, a lever pivotally connected to a fixed point on the tractor spaced from said yoke, a connection between said link and said lever spaced from the pivotal connection thereof to the tractor, and a spring connected to the lever so as to urge it in a yoke retracting direction, and said link and said lever being disposed in a sharply transverse position relatively to each other when said ram and spring are extended and so proportioned as to approach a dead-center position when said ram and spring are retracted and said implements are lowered, whereby said implements are held in the ground with substantial force regardless of the comparatively relaxed condition of the spring.

ROBERT E. HARTSOCK.
RICHARD W. HENSS.

REFERENCES CITED

The following references are of record in the file of this patent:

UNITED STATES PATENTS

| Number | Name | Date |
|---|---|---|
| 1,629,548 | Spahn | May 24, 1927 |
| 1,831,997 | Brown | Nov. 17, 1931 |
| 1,864,122 | Cole | June 21, 1932 |
| 2,070,155 | Day | Feb. 9, 1937 |
| 2,076,673 | Roper | Apr. 13, 1937 |
| 2,092,608 | Lindgren et al. | Sept. 7, 1937 |
| 2,171,830 | Hayes | Sept. 5, 1939 |
| 2,230,331 | Mobley | Feb. 4, 1941 |
| 2,233,011 | Hinds et al. | Feb. 25, 1941 |
| 2,239,387 | Johnson | Apr. 22, 1941 |
| 2,264,575 | Knapp et al. | Dec. 2, 1941 |
| 2,298,539 | Mott et al. | Oct. 13, 1942 |
| 2,304,869 | Fink et al. | Dec. 15, 1942 |
| 2,309,221 | Smith | Jan. 26, 1943 |
| 2,324,866 | Moft | July 20, 1943 |
| 2,332,720 | Hipple | Oct. 26, 1943 |
| 2,346,321 | Mott | Apr. 11, 1944 |
| 2,368,156 | Orelind et al. | Jan. 30, 1945 |
| 2,372,459 | Todd | Mar. 27, 1945 |